(12) United States Patent
Haidet

(10) Patent No.: US 12,202,220 B2
(45) Date of Patent: Jan. 21, 2025

(54) CURING MOLD ASSEMBLIES FOR NON-PNEUMATIC TIRES AS WELL AS METHODS OF MANUFACTURE

(71) Applicant: Bridgestone Americas Tire Operations, LLC, Nashville, TN (US)

(72) Inventor: Andrew V. Haidet, Tallmadge, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

(21) Appl. No.: 18/718,029

(22) PCT Filed: Dec. 29, 2022

(86) PCT No.: PCT/US2022/082513
§ 371 (c)(1),
(2) Date: Jun. 8, 2024

(87) PCT Pub. No.: WO2023/129994
PCT Pub. Date: Jul. 6, 2023

(65) Prior Publication Data
US 2024/0399689 A1    Dec. 5, 2024

Related U.S. Application Data

(60) Provisional application No. 63/294,613, filed on Dec. 29, 2021.

(51) Int. Cl.
*B29D 30/02*    (2006.01)
*B29D 30/00*    (2006.01)

(52) U.S. Cl.
CPC ......... *B29D 30/02* (2013.01); *B29D 30/0061* (2013.01)

(58) Field of Classification Search
USPC ........................................... 264/347
See application file for complete search history.

(56) References Cited

U.S. PATENT DOCUMENTS 9,662,939 B2 * 5/2017 Manesh ................. B60C 7/22
10,220,584 B2    3/2019 Seroka
(Continued)

FOREIGN PATENT DOCUMENTS

CN    107107397 A    8/2017
CN    108582612 A    9/2018
(Continued)

OTHER PUBLICATIONS

Xia, W. et al., "English machine-translation by Clarivate Analytics of CN-110435358-A", B60C7/00, Aug. 9, 2019. Full CN patent application is included. (Year: 2019).*
(Continued)

*Primary Examiner* — S. Behrooz Ghorishi
*Assistant Examiner* — Gregory C. Grosso
(74) *Attorney, Agent, or Firm* — Shaun J. Fox; Matthew P. Dugan

(57) ABSTRACT

Mold assemblies for curing non-pneumatic tires include first and second mold sections that are axially displaceable relative to one another. A primary conductive heat source is in thermal communication with the mold sections. One radiative heat source is supported on the first mold section and another radiative heat source is supported on the second mold section. A non-pneumatic tire is positioned with the mold assembly between the radiative heat sources. Tire curing systems including such mold assemblies and methods of manufacturing nonpneumatic tires are also included.

20 Claims, 12 Drawing Sheets

(56) References Cited

U.S. PATENT DOCUMENTS

2014/0332143 A1    11/2014  Narita
2019/0030846 A1     1/2019  Boncompagne et al.
2024/0075701 A1*    3/2024  Bouchereau ....... B29D 30/0601

FOREIGN PATENT DOCUMENTS

| CN | 110435358 A | 11/2019 |
| CN | 113524645 B | 12/2021 |
| EP | 2442968 B1 | 8/2014 |
| WO | WO-2017071838 A1 | 5/2017 |

OTHER PUBLICATIONS

International Search Report and Written Opinion dated May 2, 2023 issued by KIPO in connection with corresponding International Application No. PCT/US2022/082513.

Chinese Office Action and Search Report issued by CNIPA on Sep. 6, 2024 in connection with corresponding Chinese Patent Application No. 202280081880.2, and English language translation of thereof.

\* cited by examiner

CURING MOLD ASSEMBLIES FOR NON-PNEUMATIC TIRES AS WELL AS METHODS OF MANUFACTURE

This application is the National Stage of International Application No. PCT/US2022/082513, filed on Dec. 29, 2022, which claims the benefit of priority from U.S. Provisional Patent Application No. 63/294,613, filed on Dec. 29, 2021, the entire contents of which is hereby incorporated herein by reference.

BACKGROUND

The subject matter of the present disclosure broadly relates to the art of vehicle tire manufacturing and, more particularly, to mold assemblies for curing non-pneumatic tires as well as methods of manufacturing non-pneumatic tires using such mold assemblies.

The subject matter of the present disclosure may find particular application and use in conjunction with components for wheeled vehicles, and will be shown and described herein with reference thereto. However, it is to be appreciated that the subject matter of the present disclosure is also amenable to use in other applications and environments, and that the specific uses shown and described herein are merely exemplary.

Conventional pneumatic tires include a tire casing with a tread formed on or along the exterior thereof that is configured to engage a roadway or other ground surface. The tire casing includes an annular body formed from a plurality of layers and/or plies (e.g., radial plies, belt plies) with opposing sidewalls that extend radially inward from along shoulder portions of the annular body to beads forming the radially-inward extent of the sidewalls. The inner surface of the annular body and the opposing sidewalls are covered by an inner liner that defines the tire chamber of a pneumatic tire.

In conventional tire manufacturing processes, a "green" or otherwise uncured tire carcass and tread assembly is loaded into a mold assembly on a tire curing machine. The mold assembly includes a plurality of die segments with an inside surface portion that includes a section of a tread pattern. The mold assembly is closed by the tire curing machine, which positions the die segments in abutting engagement with the tread material of the uncured tire assembly. The tire curing machine also includes a curing bladder that is positioned inside the mold assembly such that the uncured tire assembly is spaced outward of the curing bladder in an uninflated condition of the curing bladder. During the curing process, the curing bladder is inflated such that the curing bladder extends into the tire chamber of the uncured tire assembly in abutting engagement with the inner liner. While under pressure from the mold assembly and the inflated curing bladder, the tire curing machine introduces heat to the uncured tire assembly which vulcanizes or otherwise crosslinks the uncured tire material to form a completed tire.

Manufacturing processes for so-called non-pneumatic tires differ from those commonly associated with conventional pneumatic tires at least in that some non-pneumatic tires include a comparatively rigid rim or other annular structure over or around which at least a portion of the tire tread extends. In many cases, the rim or other annular structure may be formed from a material (e.g., metal) that has material properties (e.g., specific heat, thermal conductivity, thermal expansion) that differs substantially from one or more other materials of the non-pneumatic tire, such as elastomeric materials and/or adhesives, for example. In such cases, the elastomeric and/or adhesive materials may undergo vulcanization or other curing processes that introduce heat and/or pressure to the "green" or otherwise uncured tire materials.

It has been recognized that certain challenges exist with uniformly heating the combination of materials during such vulcanizing or other curing processes. For example, heating a "green" or otherwise uncured non-pneumatic tire assembly too quickly or too slowly could result in some portions of the non-pneumatic tire assembly becoming overcured with other portions of the same non-pneumatic tire assembly remaining undercured. In some cases, attempts may have been made to address this issue by introducing heat from opposing directions (e.g., from radially inward and radially outward directions) during otherwise conventional curing processes. However, such efforts appear to fail to take into account the mass and/or geometry of any comparatively rigid rim or other annular structure that are integrated into non-pneumatic tires.

Accordingly, it is believed desirable to develop mold assemblies and methods of manufacture that may aid in overcoming the foregoing and/or other problems and/or disadvantages of known techniques, and/or otherwise advance the manufacture of non-pneumatic tires.

BRIEF DESCRIPTION

One example of a method of manufacturing a non-pneumatic tire in accordance with the subject matter of the present disclosure can include providing a first mold section. The first mold section can include an inner side surface portion at least partially defining a first mold cavity portion. The first mold section can be thermally coupled with a first heat source and can include a second heat source independently operable from the first heat source. The second heat source can be disposed within the first mold cavity portion and spaced inwardly from the inner side surface portion such that an annular gap is disposed therebetween. The method can also include providing a less-than-fully-cured non-pneumatic tire having an axis of rotation and including a rim with a quantity of less-than-fully-cured material disposed around the rim. The rim can include an annular wall portion extending peripherally around the axis of rotation and a flange wall portion extending radially inward from along the annular wall portion. The quantity of less-than-fully-cured material can be disposed radially outward of the annular wall portion. The flange wall portion can be oriented transverse to the axis of rotation and can include a first flange side and a second flange side. The method can further include positioning the less-than-fully-cured non-pneumatic tire along the first mold section such that at least a portion of the annular wall portion of the rim and at least a portion of the quantity of less-than-fully-cured material is disposed within the annular gap. In such an arrangement, the first flange side of the flange wall portion can be facing toward the second heat source and the second flange side of the flange wall portion can be facing away from second heat source. The method can also include providing a second mold section including a third heat source independently operable from at least the first heat source. The method can further include positioning the second mold section across the first mold cavity portion such that the third heat source is disposed in facing relation to the second flange side of the flange wall portion. The method can also include curing the non-pneumatic tire.

One example of a mold assembly in accordance with the subject matter of the present disclosure can be suitable for curing associated non-pneumatic tires that include an associated quantity of less-than-fully-cured material disposed peripherally around an associated rim. The associated rim can include an associated annular wall and an associated flange wall. The mold assembly can include first and second mold sections. The first mold section can include an inner side surface portion at least partially defining a first mold cavity portion with a longitudinal axis. The first mold section can be thermally coupled with a primary conductive heat source. The second mold section can be displaceable relative to the first mold section between a first position in which the second mold section extends at least partially across the first mold cavity portion and a second position in which the first mold cavity portion is accessible for loading and unloading the associated non-pneumatic tire. The mold assembly also includes a first radiative heat source independently operable from the primary conductive heat source. The first radiative heat source can be disposed within the first mold cavity portion and spaced inwardly from the inner side surface portion such that an annular gap is disposed therebetween. The annular gap can be dimensioned to receive at least a portion of the associated annular wall of the associated rim and at least a portion of the associated quantity of less-than-fully-cured material. The mold assembly further includes a second radiative heat source independently operable from the primary conductive heat source. The second radiative heat source can be supported on the second mold section and displaceable therewith between the first and second positions of the second mold section. The second radiative heat source can be spaced axially from the first radiative heat source in the first position of the second mold section such that the associated flange wall of the associated rim is disposed between the first and second radiative heat sources.

One example of a tire curing system for curing non-pneumatic tires can include a mold assembly according to the foregoing paragraph. The tire curing system can also include a processor communicatively coupled with a memory and with the primary conductive heat source, the first radiative heat source and the second radiative heat source. The memory can include instructions to operate the primary conductive heat source at a first nominal temperature for a first period of time. The memory can also include instructions to operate the first radiative heat source at a second nominal temperature for a second period of time that is less than the first period of time. The memory can further include instructions to operate the second radiative heat source at a third nominal temperature for a third period of time that is less than the first period of time.

DETAILED DESCRIPTION

Figure 1:
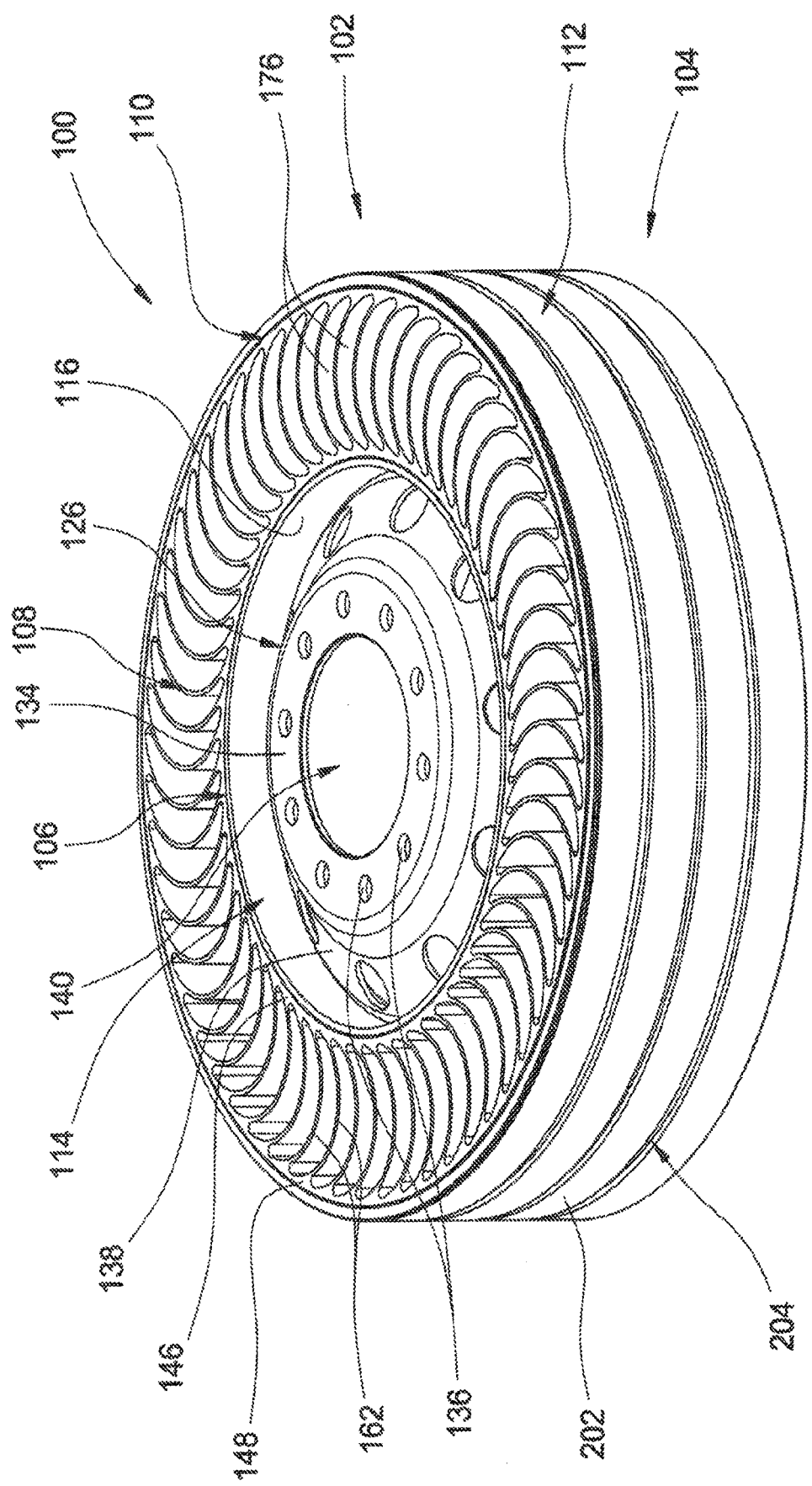
FIG. 1 is a top perspective view of an exemplary less-than-fully-cured non-pneumatic tire in an assembled condition and prepared for curing.
Figure 2:
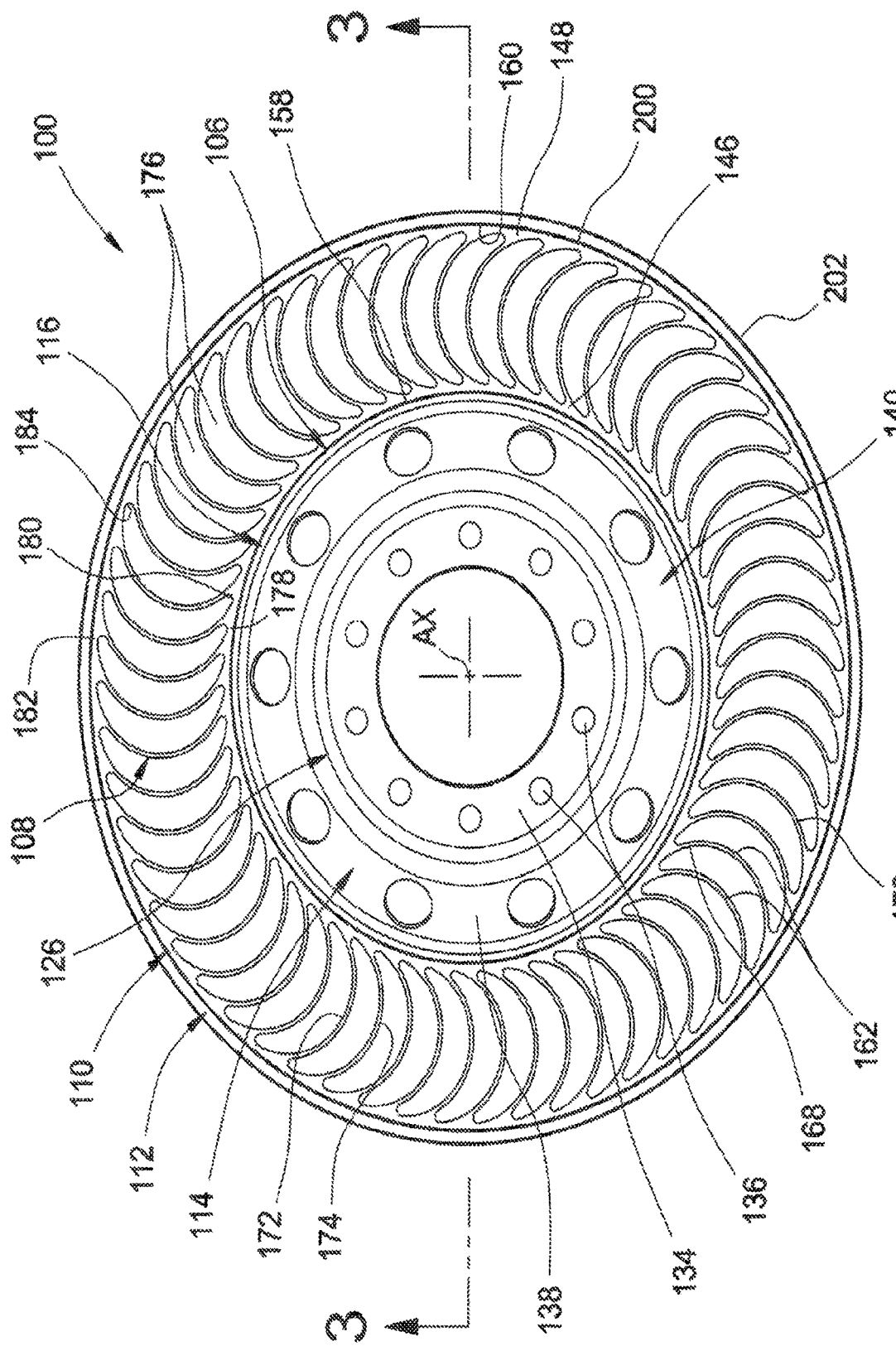
FIG. 2 is a top plan view of the exemplary less-than-fully-cured non-pneumatic tire in FIG. 1.
Figure 3:
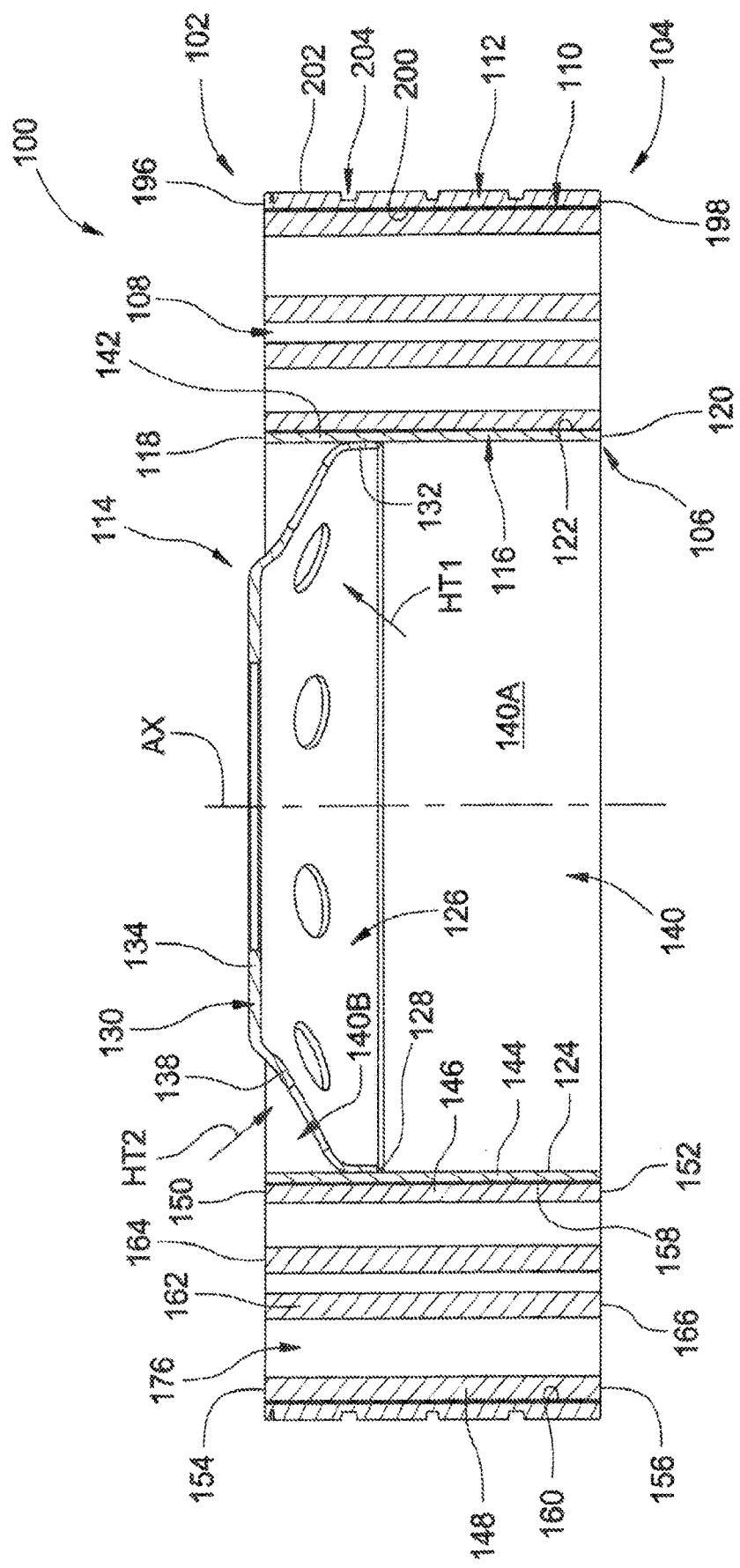
FIG. 3 is a cross-sectional side elevation view of the exemplary less-than-fully-cured non-pneumatic tire in FIGS. 1 and 2 taken from along line 3-3 in FIG. 2.
Figure 4:
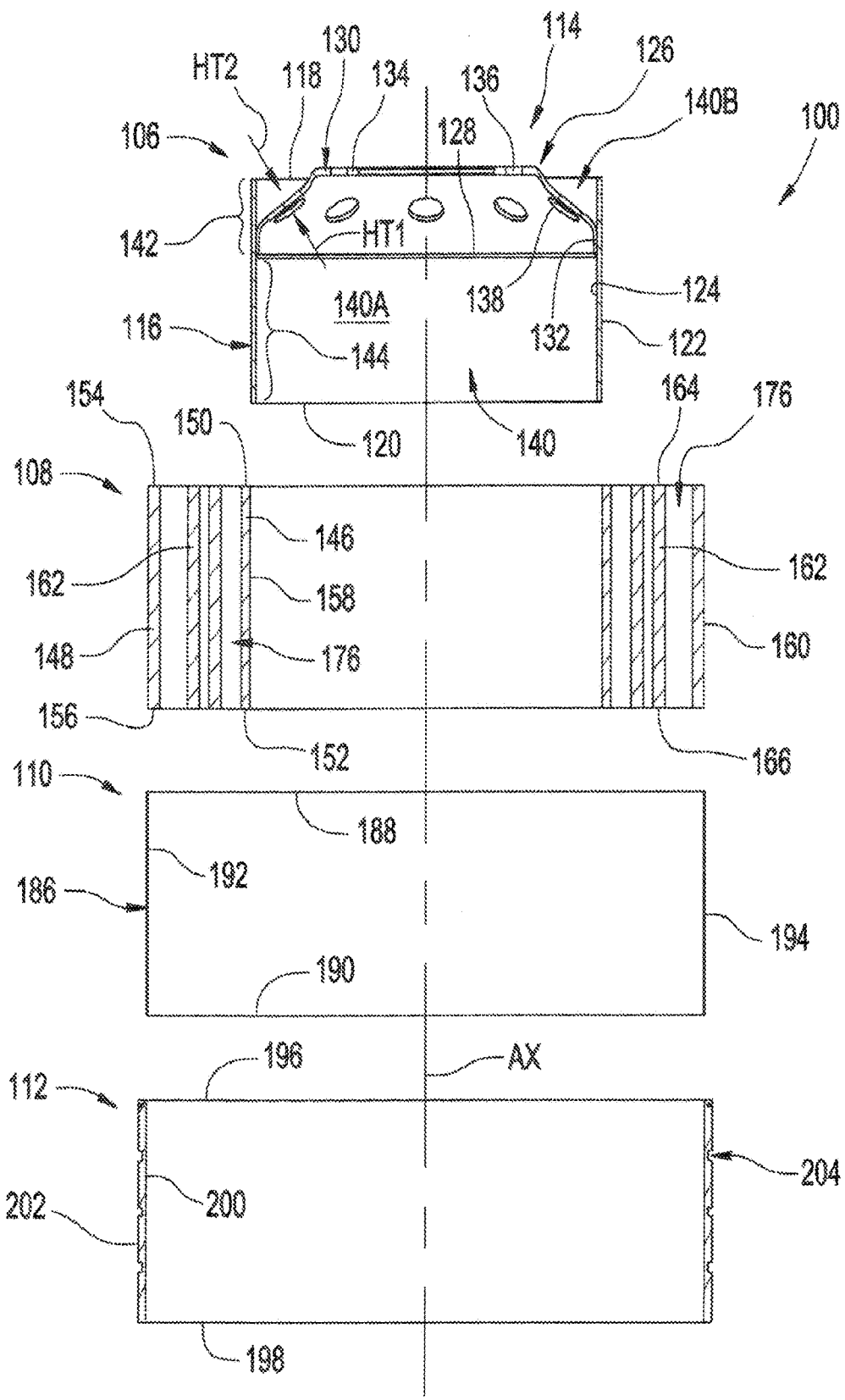
FIG. 4 is an exploded arrangement of the cross-sectional side elevation view of the exemplary less-than-fully-cured non-pneumatic tire in FIG. 3.

Turning now to the drawings, it is to be understood that the showings are for purposes of illustrating examples of the subject matter of the present disclosure and that the drawings are not to be interpreted as limiting. Additionally, it will be appreciated that the drawings are not to scale and that portions of certain features and/or elements may be exaggerated for purpose of clarity and/or ease of understanding.

For background and discussion purposes and without operating as a limitation, FIGS. 1-4 illustrate one example of a less-than-fully-cured non-pneumatic tire dimensioned and/or otherwise configured for curing in a mold assembly in accordance with the subject matter of the present disclosure and/or by way of a method of manufacture in accordance with the subject matter of the present disclosure. It will be appreciated that non-pneumatic tires of various of types, kinds and/or constructions have been developed and/or used in different applications and/or environments, and that the less-than-fully-cured non-pneumatic tire shown and described herein is merely exemplary.

As one non-limiting example, less-than-fully-cured non-pneumatic tire (or tire assembly) 100 is shown in FIGS. 1-8 as having a longitudinal axis AX and can extend axially from an end 102 to an end 104 that is opposite end 102. Less-than-fully-cured non-pneumatic tire 100 can include an annular ring 106 that extends peripherally about axis AX and a structure body 108 that is disposed outwardly of at least a portion of annular ring 106 and also extends peripherally about axis AX. Less-than-fully-cured non-pneumatic tire 100 can also include an annular ring 110 that extends peripherally around axis AX with at least a portion of annular ring 110 disposed outwardly of annular ring 106 and/or structure body 108. Less-than-fully-cured non-pneumatic tire 100 can further include a tread body 112 extending peripherally around axis AX with at least a portion of tread body 112 disposed outwardly of annular ring 110.

It will be appreciated that mold assemblies and methods of manufacture in accordance with the subject matter of the present disclosure are used to transition a non-pneumatic tire having one or more portions formed from or otherwise including one or more quantities of less-than-fully-cured material into a non-pneumatic tire in which all or substantially all portions thereof are substantially-entirely cross-linked, vulcanized and/or otherwise cured. It is to be appreciated and understood that such one or more quantities of less-than-fully-cured material can include elastomeric materials, such as natural rubber, synthetic rubber, and/or thermoplastic elastomers, for example. Additionally, or in the alternative, such one or more quantities of less-than-fully-cured material can include adhesive materials. As such, it will be appreciated and understood that any one or more of the foregoing components of non-pneumatic tire 100 can include one or more quantities of material to be transitioned from a less-than-fully-cured condition to at least a substantially-entirely cured condition, and that arrangements of non-pneumatic tire 100 that are shown and described herein are merely exemplary and not intended to be limiting.

It will be appreciated that annular ring 106 can be of any suitable size, shape and/or configuration, and can include any suitable number of one or more walls and/or wall portions. As one non-limiting example, the annular ring could be a part of or otherwise at least partially form an outer wall or outer wall portion of a vehicle wheel or rim 114, such as is shown in FIGS. 1-4, 7 and 8, for example. In such an exemplary arrangement, annular ring 106 can include a ring wall 116 that extends axially between a ring edge 118 disposed toward end 102 and a ring edge 120 that is disposed toward end 104 in axially-spaced relation to ring edge 118. Ring wall 116 of annular ring 106 can also include an outer surface portion 122 that faces radially outward and extends peripherally about longitudinal axis AX and axially between ends 102 and 104. Ring wall 116 of annular ring 106 can further include an inner surface portion 124 that extends peripherally about longitudinal axis AX and faces radially inward axially along and/or between end 102 and/or end 104.

Vehicle rim 114 also includes include a mounting hub or flange 126 that is operatively connected to annular ring 106, such as by way of a flowed material joint 128, for example. Mounting flange 126 extends radially inward from along annular ring 106 and includes one or more walls and/or wall portions oriented transverse to longitudinal axis AX. For example, mounting flange 126 can include a hub or flange wall 130 with a connector wall portion 132 that is disposed along and operatively connected to ring wall 116, such as by way of flowed material joint 128, for example. Flange wall 130 can also include a mounting wall portion 134 that is disposed radially inward of connector wall portion 132 and oriented transverse to longitudinal axis AX. Mounting wall portion 134 can be dimensioned and/or otherwise adapted for mounting in a conventional manner on or along an associated component or device, such as an axle of an associated vehicle by way of bolt holes 136, for example. In some cases, flange wall 130 can include an intermediate wall portion 138 that extends between and operatively interconnects connector wall portion 132 and mounting wall portion 134.

Regardless of the specific configuration and/or arrangement of walls and/or wall portions of vehicle rim 114, annular ring 106 at least partially defines a wheel or rim cavity 140 disposed radially inward thereof. Mounting flange 126 is at least partially disposed within rim cavity 140 and extends at least partially thereacross such that the rim cavity is separated into rim cavity portions 140A and 140B. In such an arrangement, one or more walls and/or wall portions of mounting flange 126 separate or otherwise obstruct one rim cavity portion from a portion of annular ring 106. As one example, connector wall portion 132, mounting wall portion 134 and/or intermediate wall portion 138 can separate or otherwise obstruct rim cavity portion 140A from a section 142 of ring wall 116, for example, such as in a direction of heat transfer represented by arrow HT1 in FIG. 3, for example. Additionally, or in the alternative, connector wall portion 132, mounting wall portion 134 and/or intermediate wall portion 138 can separate or otherwise obstruct rim cavity portion 140B from a section 144 of ring wall 116, for example, such as in a direction of heat transfer represented by arrow HT2 in FIG. 3, for example.

In a preferred arrangement, all or substantially all of the quantities of less-than-fully-cured material of the non-pneumatic tire can be disposed radially outward of annular ring 106. As a non-limiting example, structure body 108 can include an inner wrap or layer 146 and an outer wrap or layer 148 disposed radially outward of inner layer 146. Inner and outer layers 146 and 148 extend axially between ends 102 and 104 with inner layer 146 extending axially between edges 150 and 152 and outer layer 148 extending axially between edges 154 and 156. In some cases, inner and outer layers 146 and 148 can be substantially coextensive with one another such that edges 150 and 154 are at least approximately aligned with one another along end 102 and/or edges 152 and 156 are at least approximately aligned with one another along end 104. Inner layer 146 can at least partially define an inside surface portion 158 of structure body 108 that extends peripherally around longitudinal axis AX and axially between ends 102 and 104. Outer layer 148 can at least partially define an outer surface portion 160 of structure body 108 that extends peripherally around longitudinal axis AX and axially between ends 102 and 104.

Structure body 108 also includes a plurality of support structures 162 that extend between and operatively interconnect inner and outer layers 146 and 148. It will be appreciated that support structures 162 can be of any suitable shape, configuration and/or arrangement, and can be operatively connected to inner and outer layers 146 and 148 in any suitable manner. As one non-limiting example, support structures 162 can extend axially from an edge 164 disposed toward end 102 to an edge 166 disposed toward end 104. Support structures 162 can also include an end 168 disposed toward inner layer 146 and an end 170 disposed toward outer layer 148 in spaced relation to end 168. Support structures 162 are shown and described herein as having a curved or otherwise non-linear profile along a plane taken transverse to longitudinal axis AX. As an example, support structures 162 can include a concave surface portion 172 facing one circumferential direction about longitudinal axis AX and a convex surface portion 174 facing the opposite circumferential direction. It will be appreciated, however, that such configurations are merely exemplary and that other shapes and/or profiles could alternately be used.

Support structures 162 are disposed in peripherally-spaced relation to one another around longitudinal axis AX such that a plurality of spaces 176 are also disposed in peripherally-spaced relation to one another around the longitudinal axis with one of spaces 176 disposed between adjacent ones of support structures 162. In such an arrangement, spaces 176 can have an approximately crescent-shaped cross-sectional profile or configuration with concave surface portion 172 of one support structure 162 and convex surface portion 174 of an adjacent support structure 162 at least partially defining peripherally-spaced sides of spaces 176. In some cases, support structures 162 can extend into or otherwise be at least partially embedded within inner layer 146 and/or outer layer 148. In such cases, a portion 178 of inner layer 146 can at least partially define an end surface portion 180 of spaces 176, such as may have a curved or otherwise non-linear cross-sectional shape and/or configuration. Additionally, or in the alternative, a portion 182 of outer layer 148 can at least partially define an end surface portion 184 of spaces 176, such as may have a curved or otherwise nonlinear cross-sectional shape and/or configuration.

It will be appreciated that annular ring 110 can be of any suitable size, shape and/or configuration, and can include any suitable number of one or more walls and/or wall portions. As one non-limiting example, annular ring 110 can include a ring wall (or ring wall portion) 186 extending peripherally around longitudinal axis AX. Ring wall portion 186 can extend axially between a ring edge 188 disposed toward end 102 and a ring edge 190 that is disposed toward end 104 in axially-spaced relation to ring edge 188. Ring wall portion 186 can include an inner surface portion 192 that faces radially inward and extends peripherally about longitudinal axis AX and axially between ends 102 and 104. Ring wall portion 186 can also include an outer surface portion 194 that extends peripherally about longitudinal axis AX and faces radially outward axially along and/or between end 102 and/or end 104.

Tread body 112 can extend axially between ends 102 and 104 with a tread edge 196 disposed along end 102 and a tread edge 198 disposed along end 104. Tread body 112 can also include an inside surface portion 200 that faces radially inward and an outer surface portion 202 that faces radially outward. One or more tread structures 204 (e.g., grooves, ribs, lugs, sipes) can, optionally, be pre-formed on or otherwise extend into tread body 112 from along outer surface portion 202 of less-than-fully-cured non-pneumatic tire 100 with such tread structures adapted during the curing process to at least partially define a ground-engaging tread (or tread pattern) on the cured non-pneumatic tire.

As discussed above, one or more walls and/or wall portions of non-pneumatic tire 100 can be formed from one or more quantities of material that is in a less-than-fully-cured condition (e.g., an elastomeric material and/or an adhesive material) such that at least these walls and/or wall portions are curable using a mold assembly and/or method of manufacture with the subject matter of the present disclosure. For example, tread body 112 can be at least partially formed from one or more quantities of less-than-fully-cured elastomeric material. Additionally, or in the alternative, one or more of inner layer 146 and/or outer layer 148 of structure body 108 can be at least partially formed from a less-than-fully-cured elastomeric and/or adhesive materials. As a further example, and/or as another alternative, support structures 162 can, optionally, include one or more layers of less-than-fully-cured elastomeric and/or adhesive materials. As non-limiting examples of such constructions, support structures 162 can, in some cases, be at least partially formed from sheets of comparatively-rigid material (e.g., metal, fiber-reinforced composite) of which ends 168 and 170 can, respectively, be at least partially embedded or otherwise disposed within inner and outer layers 146 and 148 of structure body 108. Additionally, or in the alternative, a layer of less-than-fully-cured elastomeric and/or adhesive material can extend along and/or at least partially define concave surface portion 172 and/or convex surface portion 174. As another non-limiting example, support structures 162 can be at least partially formed from a plurality of comparatively-rigid wires and/or filaments arranged adjacent one another and at least partially embedded in quantities of less-than-fully-cured elastomeric and/or adhesive materials to at least partially form a sheet-like structure.

It will be appreciated that less-than-fully-cured non-pneumatic tire 100 can include any suitable elastomeric material or combination of elastomeric materials, such as natural rubbers, synthetic rubbers and/or thermoplastic elastomers, for example. Additionally, it will be recognized and appreciated, in some cases, a variety of components can be formed from a common less-than-fully-cured elastomeric material. In other cases, however, less-than-fully-cured elastomeric materials of two or more compositions, compounds and/or grades can be used. Terms such as "less-than-fully-cured," and the like, as used herein refer to elastomeric materials having polymer chains that become cross-linked or otherwise bonded when subjected to heat, pressure and/or chemical compounds with "fully cured" or "substantially fully cured" elastomeric materials exhibiting substantially different material and/or mechanical properties than "less-than-fully-cured" elastomeric materials. One non-limiting example of a suitable curing process includes vulcanization of natural and synthetic rubber elastomers.

It will be appreciated that any combination of one or more less-than-fully-cured elastomeric materials can be used or otherwise included in a less-than-fully-cured non-pneumatic tire (e.g., non-pneumatic tire 100). As one non-limiting example, less-than-fully-cured non-pneumatic tire 100 can include one or more quantities of elastomeric and/or adhesive materials substantially all of each of which is in a "green" or substantially-entirely uncured condition. As another non-limiting example, less-than-fully-cured non-pneumatic tire 100 can include one or more quantities of elastomeric and/or adhesive materials that is/are in a "green" or substantially-entirely uncured condition and one or more quantities of elastomeric and/or adhesive materials that is/are in an at least partially cured condition. As a further non-limiting example, less-than-fully-cured non-pneumatic tire 100 can include one or more quantities of elastomeric and/or adhesive materials that is/are in a partially but not entirely cured condition. As such, it is to be recognized and appreciated that less-than-fully-cured non-pneumatic tire 100 can include, without limitation: one or more quantities of "green" or substantially-entirely uncured elastomeric and/or adhesive materials; or, one or more quantities of partially but not fully cured elastomeric and/or adhesive materials; or, both one or more quantities of "green" or substantially-entirely uncured elastomeric and/or adhesive materials and one or more quantities of partially but not fully cured elastomeric and/or adhesive materials.

Figure 5:
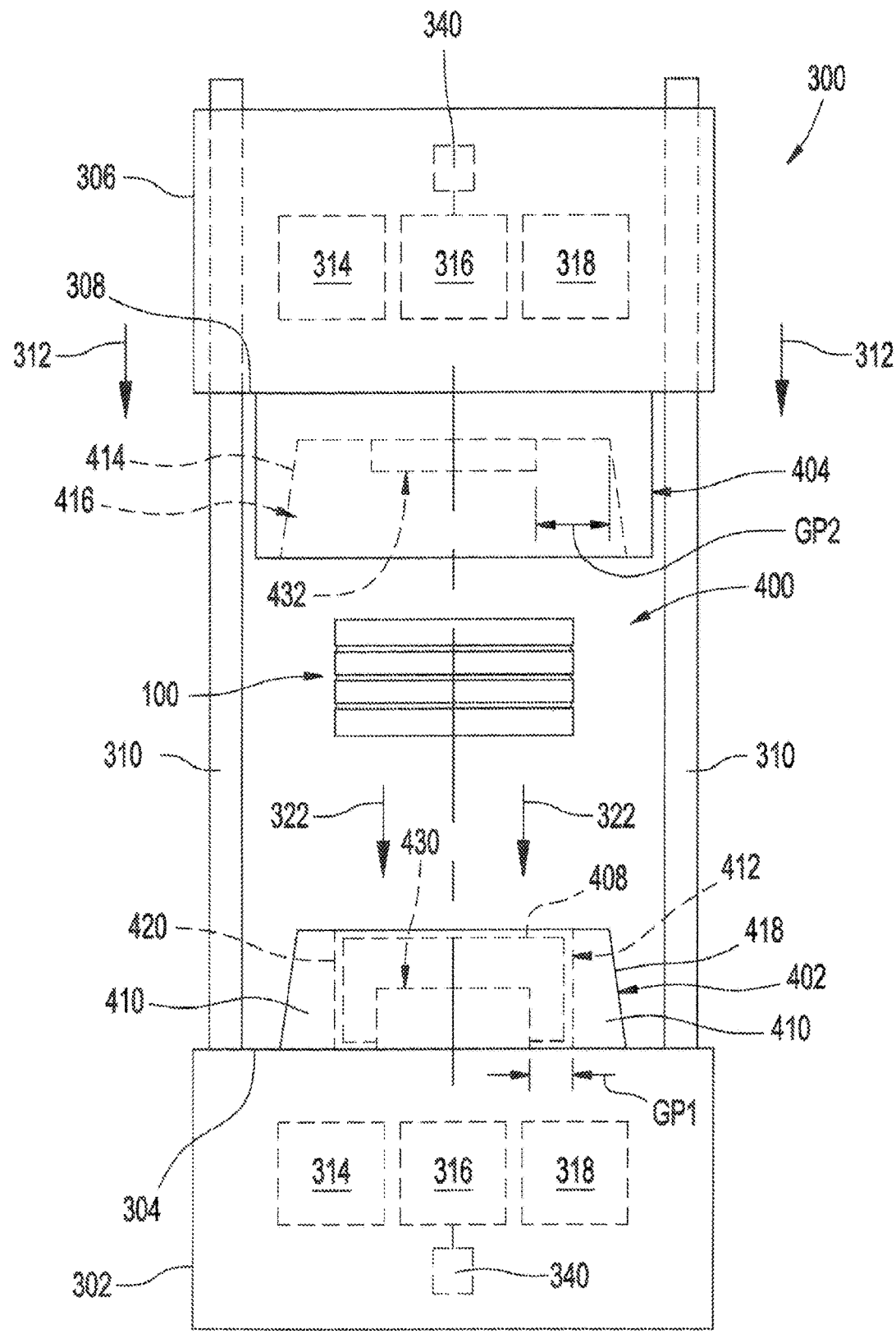
FIG. 5 is a front elevation view of a tire curing press shown with a mold assembly in accordance with the subject matter of the present disclosure shown in an open condition with an exemplary less-than-fully-cured non-pneumatic tire being loaded.
Figure 6:
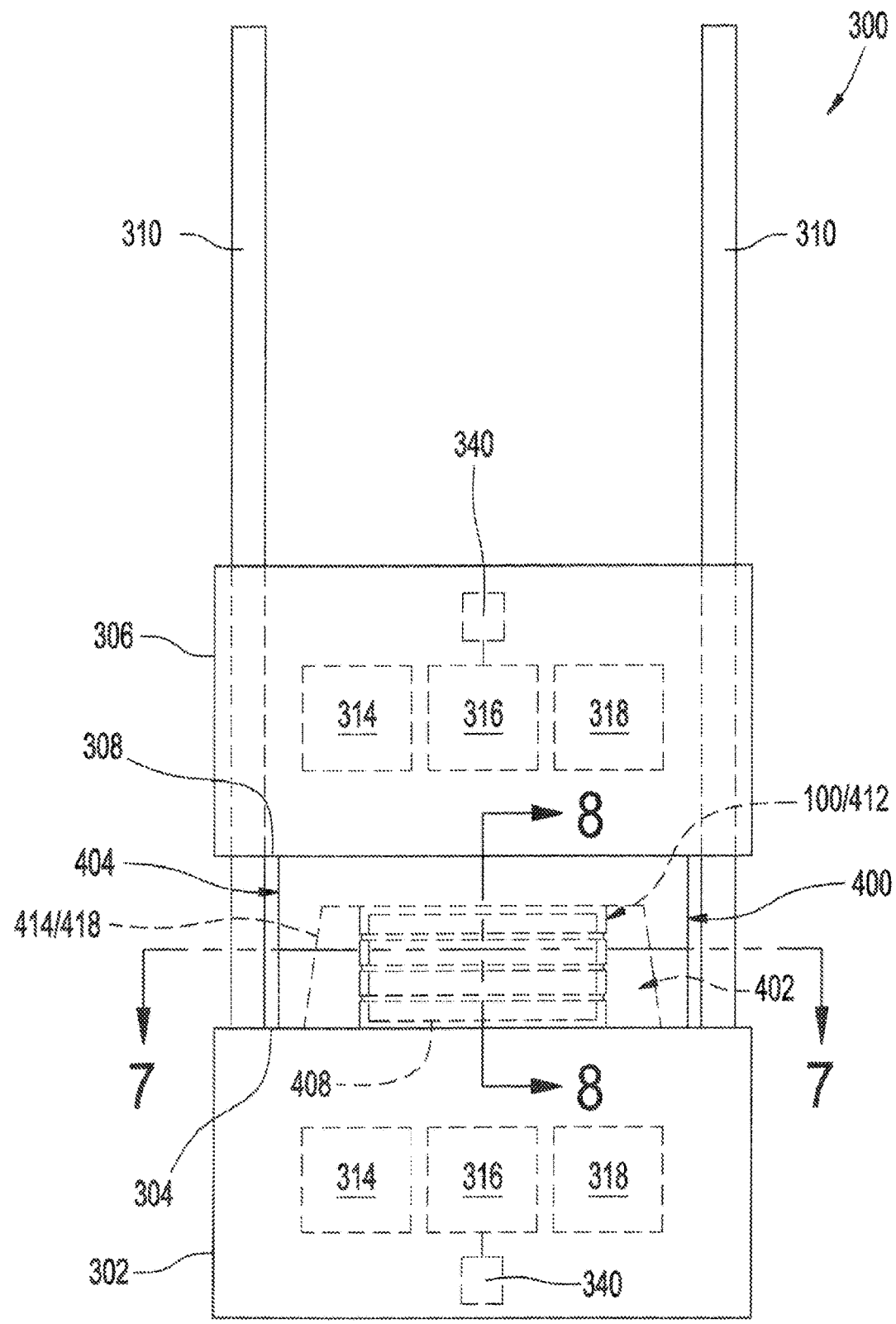
FIG. 6 is a front elevation view of the tire curing press of FIG. 5 shown with the mold assembly in a closed condition and the exemplary less-than-fully-cured non-pneumatic tire loaded for curing.
Figure 7:
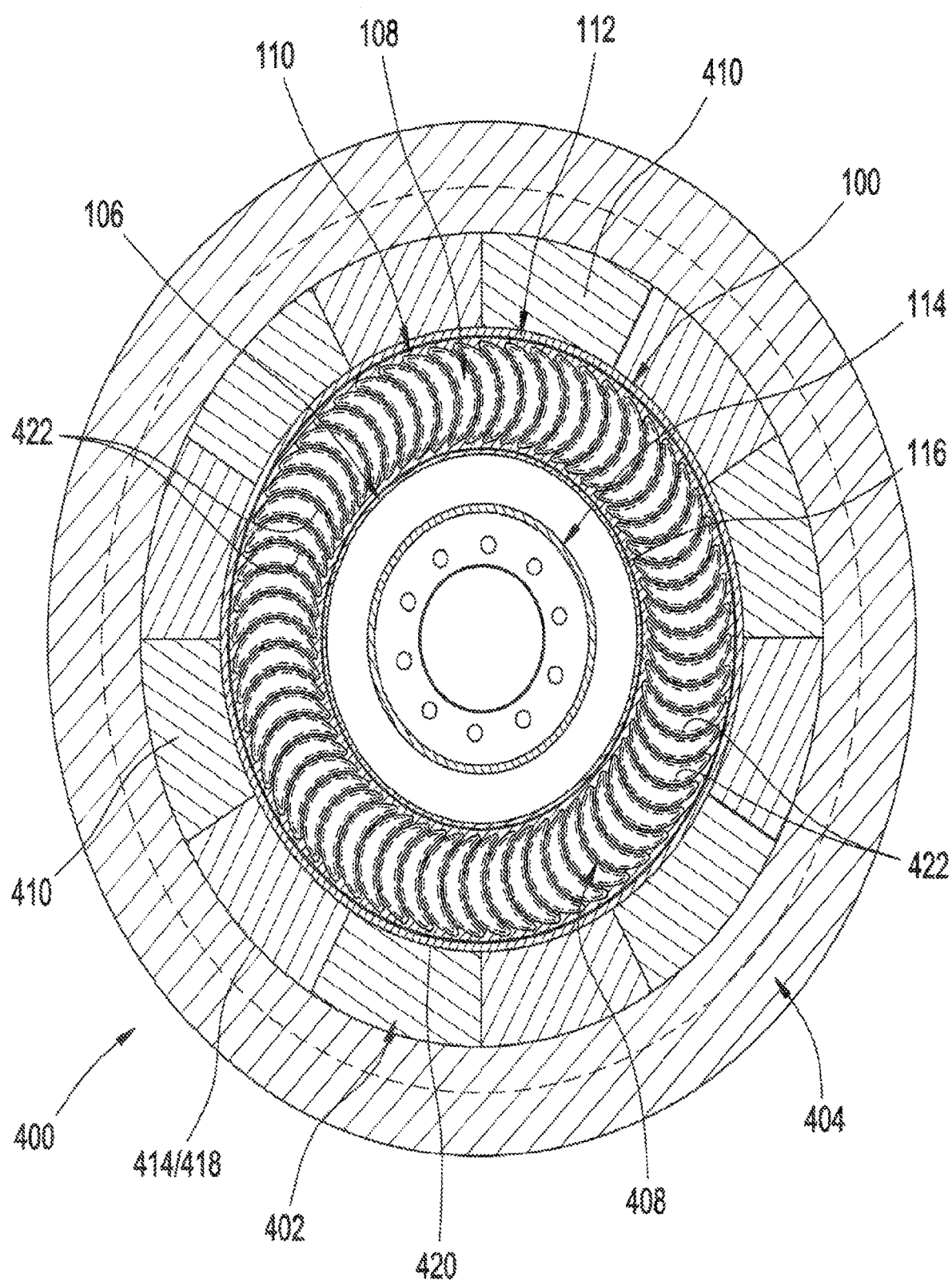
FIG. 7 is a cross-sectional view of the mold assembly and less-than-fully-cured non-pneumatic tire in FIGS. 5 and 6 taken from along line 7-7 in FIG. 6.
Figure 8:
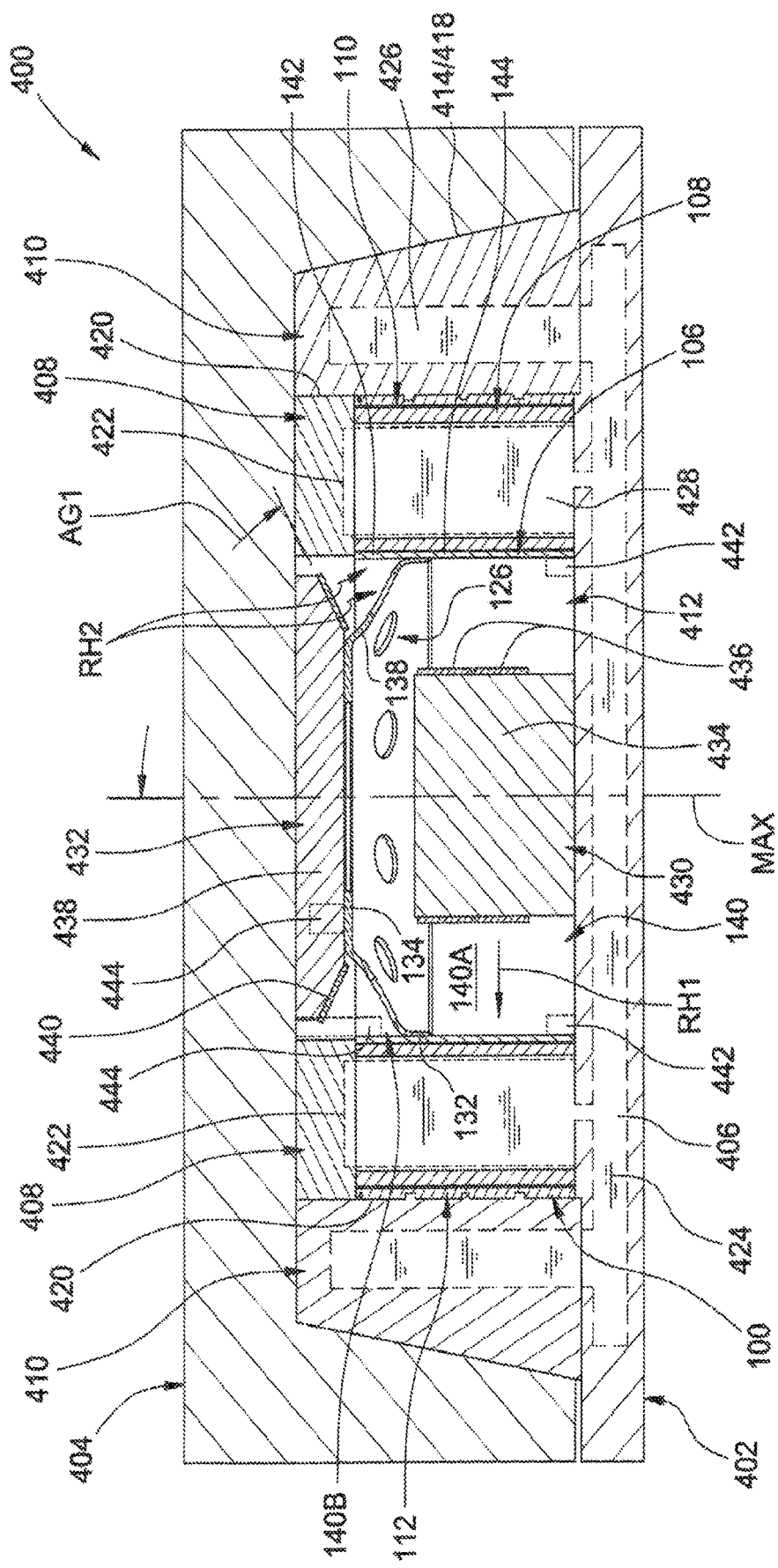
FIG. 8 is a cross-sectional view of the mold assembly and less-than-fully-cured non-pneumatic tire in FIGS. 5-7 taken from along line 8-8 in FIG. 6.

FIGS. 5 and 6 schematically illustrate an otherwise conventional tire curing press 300 that includes a press base 302 with a base mounting surface 304. Tire curing press 300 also includes a press head 306 with a head mounting surface 308. Press head 306 is moveable relative to press base 302, such as along linear guide rods 310, for example, in a conventional manner. Press head 306 is shown in FIG. 5 as being disposed in a first or raised position that is moveable to a second or lowered position shown in FIG. 6, which movement is represented in FIG. 5 by arrows 312. Tire curing press 300 can include one or more pressurized fluid sources, one or more heated fluid sources and/or one or more motion actuators, such as are schematically represented in FIGS. 5 and 6 by dashed boxes 314, 316 and 318, respectively, and can be included on, along or be otherwise operatively associated with press base 302 and/or press head 306, as is well known in the art. Tire curing press 300 can further include a control system 320 communicatively coupled with one or more components and/or systems of the tire curing press and adapted for selective operation thereof in accordance with the subject matter of the present disclosure. It will be appreciated that control system 320 can be included on, along or be otherwise operatively associated with press base 302, press head 306 and/or any other components and/or systems of tire curing press 300, such as may be otherwise known in the art.

A mold assembly 400 in accordance with the subject matter of the present disclosure is shown in FIGS. 5-8 as being operatively supported within or otherwise on or along tire curing press 300. Mold assembly 400 includes a mold section 402 that is supported on or along base mounting surface 304 of press base 302 and a mold section 404 that is supported on or along head mounting surface 308 of press head 306. Mold sections 402 and/or 404 can be operatively connected in fluid communication with pressurized fluid source 314 and/or heated fluid source 316 in any manner suitable for transferring pressurized fluid to and/or from the mold sections, such as by way of one or more conduits or passages 406 (FIG. 8), for example.

Mold assembly 400 includes a mold axis MAX extending in or otherwise along the direction of movement 312 of tire curing press 300. As such, mold sections 402 and 404 are axially displaceable relative to one another during operation of the tire curing press with mold sections 402 and 404 shown spaced apart in FIG. 5 representing an open condition of the mold assembly and with mold sections 402 and 404 shown coextensively engaged with one another in FIG. 6 representing a closed condition of the mold assembly. Mold section 402 can, optionally, include an interstitial curing system 408. Additionally, mold section 402 can, optionally, include a plurality of tread die segments 410 that are disposed peripherally about interstitial curing system 408 to at least partially define a mold cavity 412 within mold section 402. Mold section 404 includes a surface portion 414 that at least partially defines a mold cavity 416 within the mold section. Mold cavity 416 is dimensioned to receive at least a portion of mold section 402 in a closed condition of the mold assembly. In some cases, an outer surface portion 418 of tread die segments 410 can abuttingly engage surface portion 414 of mold section 404 as the mold sections move toward the closed condition.

For example, with a less-than-fully-cured non-pneumatic tire 100 loaded into or otherwise positioned within mold cavity 416, as is represented in FIG. 5 by arrows 322 and shown in FIG. 6, tread die segments 410 are displaced radially inward into engagement with tread body 112 of less-than-fully-cured non-pneumatic tire 100. Such radial compression urges inside surface portion 200 of tread body 112 into engagement with outer surface portion 194 of annular ring 110. Additionally, such radial compression urges inner surface portion 192 of annular ring 110 into engagement with outer surface portion 160 of structure body 108. In some cases, such radial compression can also urge inside surface portion 158 of structure body 108 into engagement with outer surface portion 122 of annular ring 106. Furthermore, tread die segments 410 include an inner surface portion 420 generally opposite surface portion 418 that at least partially defines mold cavity 412. In some cases, additional features can be formed on or along inner surface portion 420, such as can extend into engagement with tread body 112 from along outer surface portion 202 thereof under such radial compression to at least partially define ground-engaging tread pattern (e.g., grooves, ribs, lugs, sipes) on or along non-pneumatic tire 100.

Depending on the configuration and/or construction of the less-than-fully-cured non-pneumatic tires with which a mold assembly in accordance with the subject matter of the present disclosure is intended to be used (e.g., non-pneumatic tires 100), the mold assembly can, optionally, include an interstitial curing system that can be interengaged axially-coextensively with the plurality of support structures (e.g., support structures 162) and plurality of interleaved spaces (e.g., spaces 176), such as to apply heat and/or pressure to the support structures and/or adjacent wall portions (e.g., inner layer 146 and/or outer layer 148). If included, it will be appreciated that an interstitial curing system of any suitable type, kind and/or construction can be used. As one non-limiting example, interstitial curing system 408 can include a plurality of curing shoe assemblies 422 operatively associated with mold section 402 and/or mold section 404, such as is represented by dashed lines in FIGS. 5, 7 and 8.

In a preferred arrangement, curing shoe assemblies 422 are arranged such that one or more of the curing shoe assemblies is disposed within one of spaces 176 when less-than-fully-cured non-pneumatic tire 100 is positioned within mold cavity 412. In such an arrangement, curing shoe assemblies 422 can be selectively actuated and de-actuated (or otherwise released) such that the curing shoes thereof correspondingly engage and disengage one or more walls and/or wall portions structure body 108. In an engaged condition, the curing shoe assemblies can apply surface pressure and/or transfer heat into structure body 108, such as may operate to transition one or more walls and/or wall portions of the structure body that are formed from a less-than-fully-cured elastomeric material into a substantially-cured elastomeric material.

As discussed above, less-than-fully-cured non-pneumatic tire 100 can be transitioned into a substantially-entirely-cured non-pneumatic tire through the application of pressure and/or transfer of heat into the one or more quantities of less-than-fully-cured material (or materials) of the non-pneumatic tire. Application of pressure can be achieved in any suitable manner, such as may be provided through radially-inward displacement of otherwise conventional tread die segments 410, for example. Additionally, transfer of heat into the one or more quantities of less-than-fully-cured material (or materials) can be at least partially provided through an otherwise conventional primary heat source, such as is represented in FIGS. 5 and 6 by heated fluid source 316, for example. It will be appreciated that conventional tire curing systems transfer heated fluid through one or more sections of a mold assembly. During a conventional curing process, the heated mold section(s) transfer heat into the one or more quantities of less-than-fully-cured material (or materials) with such heat transfer primarily occurring through thermal conduction from the heated mold sections into the one or more quantities of less-than-fully-cured material (or materials).

It will be appreciated that a wide variety of conventional fluid communication systems are known and have been used to transfer heated fluid into, out of and/or otherwise through otherwise conventional mold sections. As a non-limiting example of such an arrangement, a primary heat source (e.g., heated fluid source 316) can transfer heated fluid 424 (e.g., air, steam, water, oil) into, out of and/or otherwise through mold section 402 through conduits or passages 406. In some cases, tread die segments 410 can include one or more passages and/or cavities 426 into, out of and/or otherwise through which heated fluid 424 can circulate or otherwise flow thereby transferring heat into the tread die segments. Additionally, or in the alternative, curing shoe assemblies 422 can include one or more passages and/or cavities 428 into, out of and/or otherwise through which heated fluid 424 can circulate or otherwise flow thereby transferring heat into the curing shoe assemblies. Additionally, or in the alternative, any one or more of the foregoing arrangements for circulation and/or other flow of heated fluid through mold section 402 is equally applicable to mold section 404. It will be appreciated that conductive heat transfer using the circulation and/or flow of heated fluid 424 through mold section 402 and/or 404 as well as through any curing shoe assemblies thereof (e.g., curing shoe assemblies 422), if included, collectively represents a conventional primary heat source operatively associated with mold assembly 400.

It has been recognized that the mass of the rim (e.g., rim 114) of less-than-fully-cured non-pneumatic tires (e.g., non-pneumatic tire 100) can undesirably influence conductive heat transfer from the conventional primary heat source into the one or more quantities of less-than-fully-cured material or materials of the non-pneumatic tire, such as has been discussed above, for example. Additionally, it has been recognized that the configuration and/or geometry of the walls and/or wall portions of the rim can also undesirably influence such conventional conductive heat transfer. As such, mold assemblies and methods of manufacture in accordance with the subject matter of the present disclosure include and/or selectively operate one or more radiative heat sources in addition to and provided separately from the primary conductive heat source. Additionally, the one or more radiative heat sources are controllable independently from the primary conductive heat source, such as to selectively direct heat transfer into or toward the rim of the non-pneumatic tire. In some cases, the one or more radiative heat sources may be controllable independently from the primary conductive heat source. In cases in which two or more radiative heat sources are included, the two radiative heat sources can also be controllable independently of one another. Furthermore, in a preferred arrangement, at least one of the two or more radiative heat sources are operatively disposed along one mold section (e.g., mold section 402) of the mold assembly (e.g., mold assembly 400) with at least a different one of the two or more radiative heat sources operatively disposed on or along a different mold section (e.g., mold section 404) of the mold assembly (e.g., mold assembly 400).

As a non-limiting example, mold assembly 400 can include a radiative heat source 430 operatively supported on or along mold section 402 and a radiative heat source 432 operatively supported on or along mold section 404. Radiative heat source 430 is shown as being disposed on or along mold section 402 within mold cavity 416. And, radiative heat source 430 is positioned within mold cavity 416 such that an annular space or gap GP1 is formed between the radiative heat source and surface portions 414 of tread die segments 410 such that at least a portion of non-pneumatic tire 100 can be positioned within gap GP1. In such an arrangement, at least a portion of non-pneumatic tire 100 is axially coextensive with radiative heat source 430 with annular ring 106 disposed toward the radiative heat source and tread body 112 disposed outwardly thereof in a direction toward tread die segments 410. Radiative heat source 432 is shown as being supported on or along mold section 404 and positioned within mold cavity 416 in a closed position of mold assembly 100. Additionally, radiative heat source 432 is arranged within mold cavity 416 such that an annular space or gap GP2 is formed between the radiative heat source and surface portions 414 of tread die segments 410 in the closed position of the mold assembly. In such an arrangement, at least a portion of non-pneumatic tire 100 is also positioned within gap GP2 with at least a portion of non-pneumatic tire 100 axially coextensive with radiative heat source 432.

Figure 9:
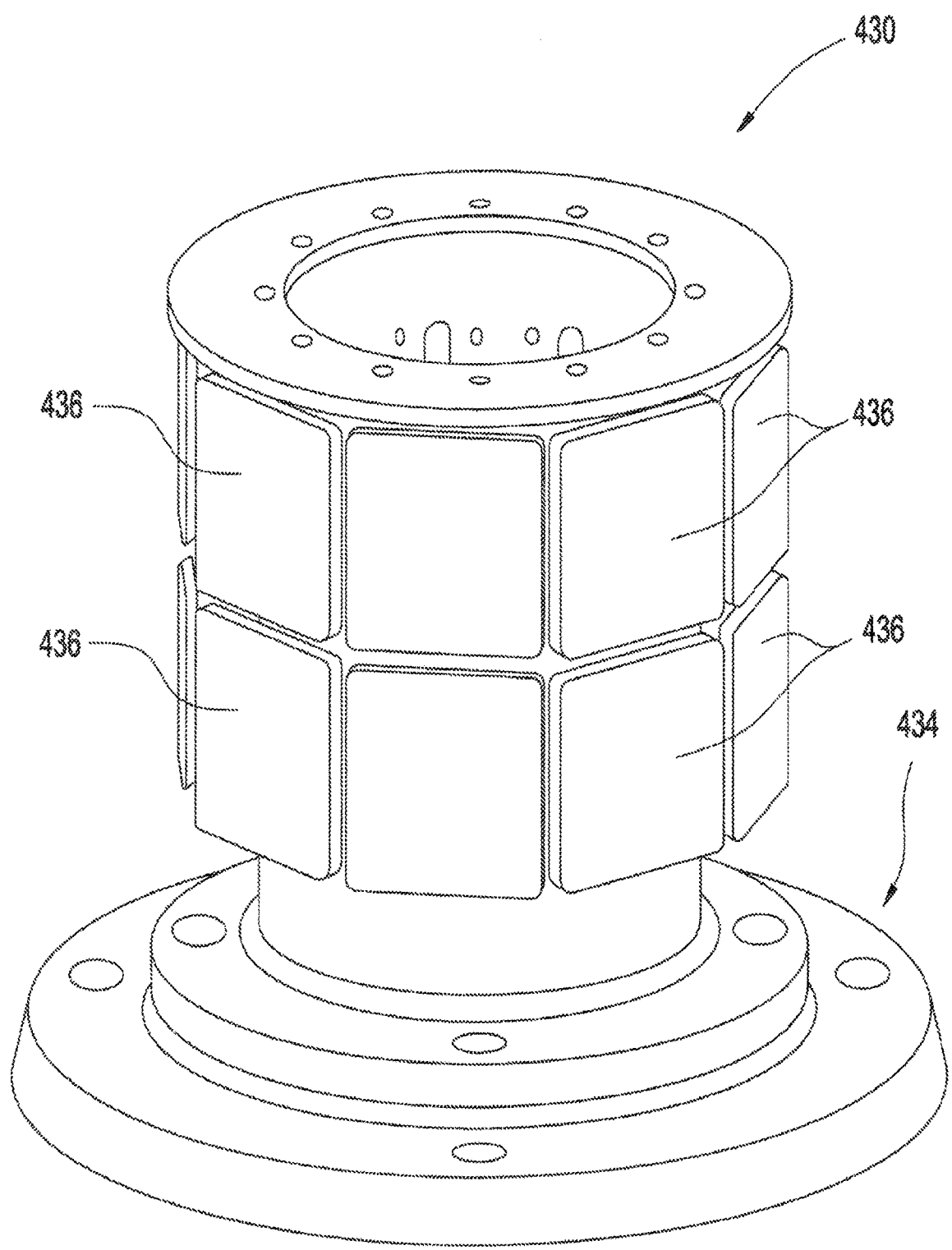
FIG. 9 is a top perspective view of the exemplary secondary heat source shown in FIG. 8.

Radiative heat source 430 can include a base wall 434 that is operatively connected to mold section 402 with one or more radiative heating elements operatively supported on or along the base wall. In the arrangement shown in FIGS. 8 and 9, for example, radiative heat source 430 can include a plurality of radiative heating elements 436 disposed in spaced relation to one another peripherally around and/or axially along base wall 434. In such an arrangement, radiative heating elements 436 can face transverse to mold axis MAX such that the radiative heating elements face radially outward toward ring wall 116 of annular ring 106. In some cases, radiative heating elements 436 can be arranged in a faceted or otherwise somewhat-cylindrical orientation and can be selectively operated to direct radiative heat toward section 144 of ring wall 116, as is represented by arrow RH1.

Figure 10:
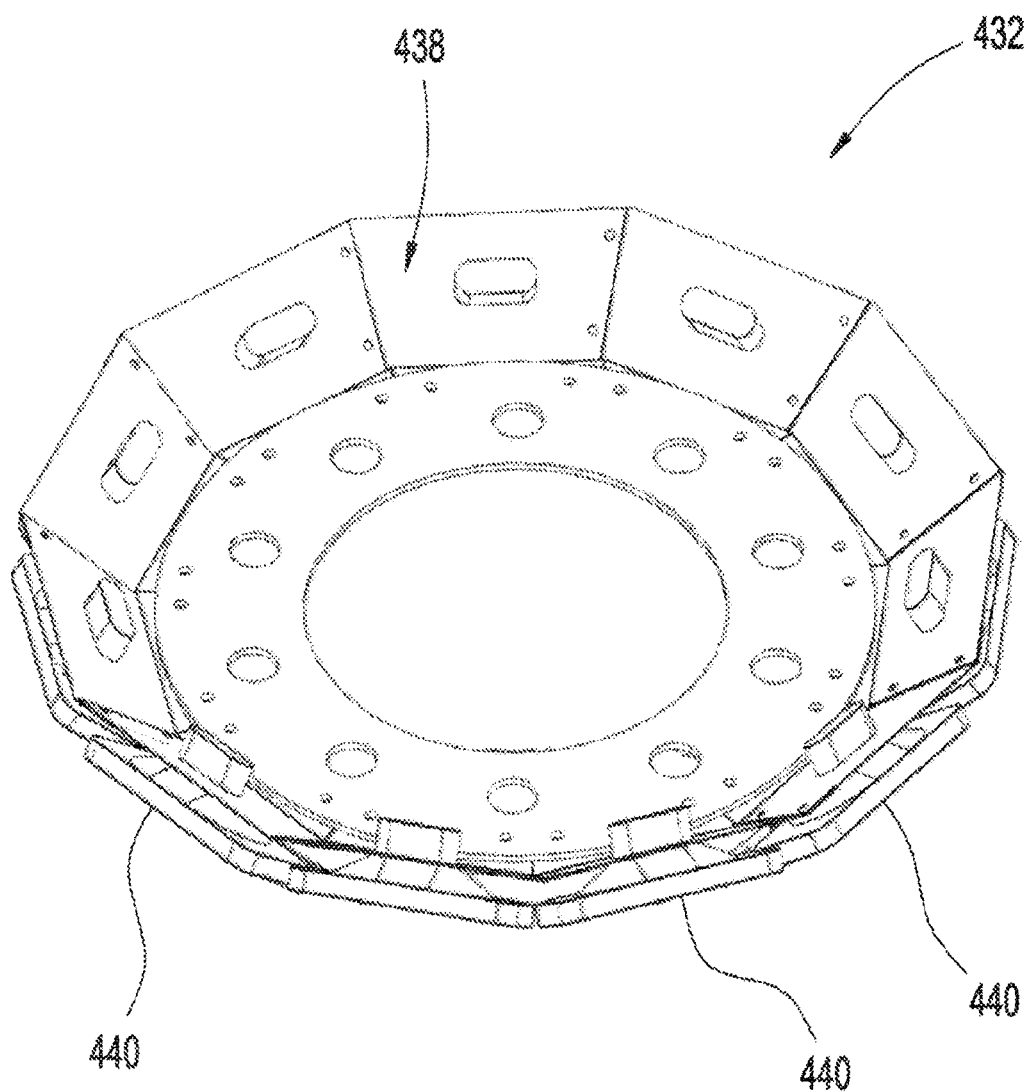
FIG. 10 is a top perspective view of the exemplary tertiary heat source shown in FIG. 8.

Radiative heat source 432 can include a base wall 438 that is operatively connected to mold section 404 with one or more radiative heating elements operatively supported on or along the base wall. In the arrangement shown in FIGS. 8 and 10, for example, radiative heat source 432 can include a plurality of radiative heating elements 440 disposed in spaced relation to one another peripherally around base wall 438. In a preferred arrangement, radiative heating elements 440 are oriented at an acute included angle relative to mold axis MAX, such as is represented by reference dimension AG1 in FIG. 8, for example. In such an arrangement, radiative heating elements 440 face radially outward toward ring wall 116 of annular ring 106 as well as axially toward at least a portion of mounting flange 126. Radiative heating elements 440 can be arranged in a faceted or otherwise somewhat-frustoconical orientation and can be selectively operated to direct radiative heat toward section 142 of ring wall 116 as well as toward one or more portions of mounting flange 126, as is represented by arrows RH2.

It will be appreciated that radiative heat sources 430 and 432 can utilize any suitable energy source for generation of radiative heat. As one example, either one or both of the radiative heat sources could utilize a combustion process to generate radiative heat, such by utilizing one or more gas-fired combustion panels, for example. Additionally, or in the alternative, radiative heat source 430, radiative heat source 432, or both radiative heat sources 430 and 432 could utilize electricity to generate radiative heat, such as by utilizing one or more resistive heating elements, for example.

As discussed above, radiative heat sources 430 and 432 can be selectively controlled independent of the primary conductive heat source (e.g., heated fluid source 316). Additionally, radiative heat sources 430 and 432 can be selectively controlled independently of one another. It will be appreciated that such selective operation and/or control of primary conductive heat source 316 as well as radiative heat sources 430 and/or 432 can be achieved in any suitable manner and through the use of any suitable combination of components and/or systems. As a non-limiting example, control system 320 of tire curing press 300 can be communicatively coupled or otherwise operatively associated with mold assembly 400 for selective operation and/or control of radiative heat sources 430 and 432 as well as primary conductive heat source 316.

As a non-limiting example, control system 320 can include a controller 324 communicatively coupled with various devices, components and/or systems of tire curing press 300 and/or mold assembly 400, such as may be suitable for sending, receiving and/or otherwise communicating signals, data, values and/or information to, from and/or otherwise between the controller and one or more of such devices, components and/or systems. It will be appreciated that controller 324 can include any suitable hardware, software and/or combination thereof for configuration and operation of a tire sensing system in accordance with the subject matter of the present disclosure. For example, controller 324 can include a processing device, which can be of any suitable type, kind and/or configuration, such as a microprocessor, for example, for processing data, executing software routines/programs, and other functions relating to the performance and/or operation of tire curing press 300 and/or mold assembly 400. Additionally, the controller can include a memory of any suitable type, kind and/or configuration that can be used to store software, parameters, settings, inputs, data, values and/or other information for use in association with the performance and/operation of tire curing press 300 and/or mold assembly 400. In the arrangement shown in FIG. 11, controller 324 includes a microprocessor 326 and a memory 328, which includes boxes 328A and 328B.

Figure 11:
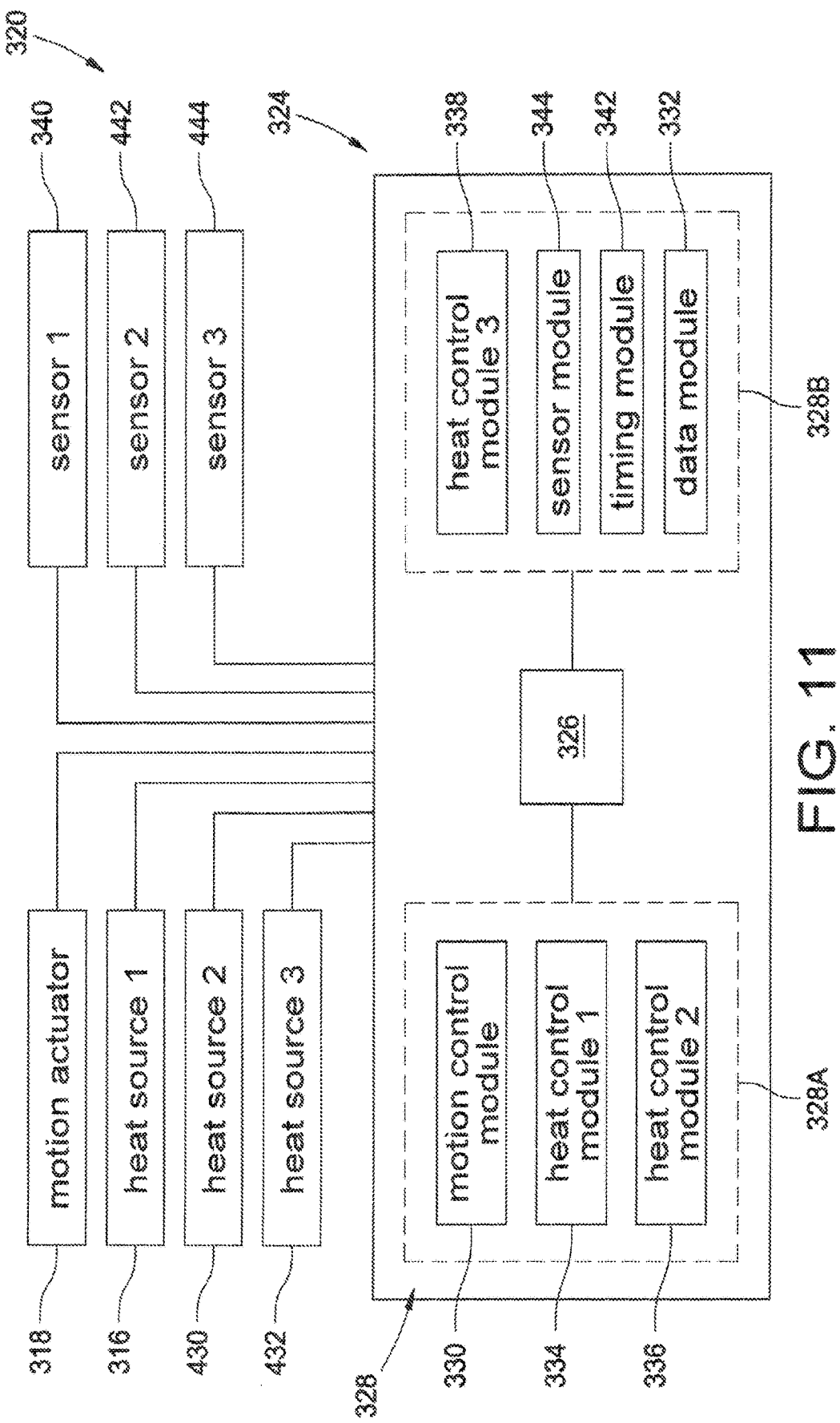
FIG. 11 is a schematic representation of an exemplary control system operatively associated with a mold assembly in accordance with the subject matter of the present disclosure.

As shown in FIG. 11, controller 324 can, optionally, include a motion control module 330 that is capable of requesting, receiving, processing, storing and/or otherwise transferring data, values, information, signals and/or communications into and/or out of tire curing press 300 and/or mold assembly 400, such as may relate to or be associated with the operation of motion actuators 318 and/or otherwise movement of mold sections 402 and/or 404 to, from and/or between open and closed positions, such as are shown in FIGS. 5 and 6, respectively. In some cases, motion control module 330 can request, receive, process and/or store data, values, information, signals and/or communications such as may relate to or be associated with the operation of motion actuators 318 and/or otherwise movement of mold sections 402 and/or 404 to, from and/or between open and closed positions, which can be stored in memory 328, such as is represented by box 332 in FIG. 11, for example.

Controller 324 can include a heat control module 334 that is capable of requesting, receiving, processing, storing and/or otherwise transferring data, values, information, signals and/or communications into and/or out of tire curing press 300 and/or mold assembly 400, such as may relate to or be associated with the operation of primary conductive heat source 316 and/or the circulation and/or transfer of heated fluid into, out of and/or otherwise through mold assembly 400 in connection with transition of a non-pneumatic tire having one or more portions formed from or otherwise including one or more quantities of less-than-fully-cured material into a non-pneumatic tire in which all or substantially all portions thereof are substantially-entirely cross-linked, vulcanized and/or otherwise cured. In some cases, heat control module 334 can request, receive, process and/or store data, values, information, signals and/or communications such as may relate to or be associated with the operation of primary conductive heat source 316 and/or the circulation and/or transfer of heated fluid into, out of and/or otherwise through mold assembly 400, which can be stored in memory 328, such as is represented by box 332 in FIG. 11, for example.

Controller 324 can include a heat control module 336 that is capable of requesting, receiving, processing, storing and/or otherwise transferring data, values, information, signals and/or communications into and/or out of tire curing press 300 and/or mold assembly 400, such as may relate to or be associated with the operation of radiative heat source 430 and/or transfer of radiative heat into rim 114. In some cases, heat control module 336 can request, receive, process and/or store data, values, information, signals and/or communications such as may relate to or be associated with the operation of radiative heat source 430 and/or the transfer of radiative heat into rim 114, which can be stored in memory 328, such as is represented by box 332 in FIG. 11, for example.

Controller 324 can include a heat control module 338 that is capable of requesting, receiving, processing, storing and/or otherwise transferring data, values, information, signals and/or communications into and/or out of tire curing press 300 and/or mold assembly 400, such as may relate to or be associated with the operation of radiative heat source 432 and/or transfer of radiative heat into rim 114. In some cases, heat control module 336 can request, receive, process and/or store data, values, information, signals and/or communications such as may relate to or be associated with the operation of radiative heat source 432 and/or the transfer of radiative heat into rim 114, which can be stored in memory 328, such as is represented by box 332 in FIG. 11, for example.

It will be appreciated that the transition of a non-pneumatic tire having one or more portions formed from or otherwise including one or more quantities of less-than-fully-cured material into a non-pneumatic tire in which all or substantially all portions thereof are substantially-entirely cross-linked, vulcanized and/or otherwise cured can be monitored or controlled in any suitable manner. As one non-limiting example, the transition from a less-than-fully-cured non-pneumatic tire to a substantially-entirely cured non-pneumatic tire could be at least partially controlled as a function of time. As another non-limiting example, the transition from a less-than-fully-cured non-pneumatic tire to a substantially-entirely cured non-pneumatic tire could be at least partially controlled as a function of temperature. As a further non-limiting example, the transition from a less-than-fully-cured non-pneumatic tire to a substantially-entirely cured non-pneumatic tire could be at least partially controlled as a function of a combination of both time and temperature.

In such cases, tire curing press 300 and/or mold assembly 400 can include one or more temperature sensors operatively associated therewith. As one example, tire curing press 300 and/or mold assembly 400 could include one or more sensors 340 operable to generate data, signals and/or other communications having a relation to a temperature associated with primary conductive heat source 316 and/or the circulation and/or transfer of heated fluid into, out of and/or otherwise through mold assembly 400. Additionally, or in the alternative, mold assembly 400 can include one or more sensors 442 operatively associated with mold section 402. Further, or as a further alternative, mold assembly 400 can include one or more sensors 444 operatively associated with mold section 404.

In a preferred arrangement, sensor 442 can the thermally coupled with one or more walls, wall portions and/or sections of rim 114 in a closed condition of mold assembly 400 and/or otherwise during at least a portion of a curing cycle in which a less-than-fully-cured non-pneumatic tire is transitioned to a substantially-entirely cured non-pneumatic tire. In the exemplary arrangement shown in FIG. 8, sensors 442 are disposed in thermal communication with section 116A of ring wall 116. Additionally, or in the alternative, sensor 444 can the thermally coupled with one or more walls, wall portions and/or sections of rim 114 in a closed condition of mold assembly 400 and/or otherwise during at least a portion of a curing cycle in which a less-than-fully-cured non-pneumatic tire is transitioned to a substantially-entirely cured non-pneumatic tire. In the exemplary arrangement shown in FIG. 8, sensors 444 are disposed in thermal communication with section 116B of ring wall 116 and along mounting wall portion 134 of flange wall 130.

As such, controller 324 can include a timing module 342 that is capable of requesting, receiving, processing, storing and/or otherwise transferring data, values, information, signals and/or communications into and/or out of tire curing press 300 and/or mold assembly 400, such as may relate to or be associated with: 1) timing and/or duration of operation of primary conductive heat source 316 and/or the circulation and/or transfer of heated fluid into, out of and/or otherwise through mold assembly 400; 2) timing and/or duration of operation of radiative heat source 430; and/or 3) timing and/or duration of operation of radiative heat source 432. In some cases, timing module 342 can include a timer or counter. Additionally, in some cases, timing module 342 can request, receive, process and/or store data, values, information, signals and/or communications such as may relate to or be associated with: 1) timing and/or duration of operation of primary conductive heat source 316 and/or the circulation and/or transfer of heated fluid into, out of and/or otherwise through mold assembly 400; 2) timing and/or duration of operation of radiative heat source 430; and/or 3) timing and/or duration of operation of radiative heat source 432, any and/or all of which can be stored in memory 328, such as is represented by box 332 in FIG. 11, for example.

Controller 324 can be communicatively coupled with any one or more of sensors 340, sensors 442 and/or sensors 444. In such case, controller 324 can include a sensor module 344 that is capable of requesting, receiving, processing, storing and/or otherwise transferring data, values, information, signals and/or communications into and/or out of tire curing press 300 and/or mold assembly 400, such as may relate to or be associated with: 1) a temperature having a relation to primary conductive heat source 316 and/or the circulation and/or transfer of heated fluid into, out of and/or otherwise through mold assembly 400; 2) a temperature having a relation to operation of radiative heat source 430; 3) a temperature having a relation to operation of radiative heat source 432; and/or 4) a temperature having a relation to one or more walls and/or wall portions of rim 114. Additionally, in some cases, sensor module 344 can request, receive, process and/or store data, values, information, signals and/or communications such as may relate to or be associated with: 1) a temperature having a relation to primary conductive heat source 316 and/or the circulation and/or transfer of heated fluid into, out of and/or otherwise through mold assembly 400; 2) a temperature having a relation to operation of radiative heat source 430; 3) a temperature having a relation to operation of radiative heat source 432; and/or 4) a temperature having a relation to one or more walls and/or wall portions of rim 114, any and/or all of which can be stored in memory 328, such as is represented by box 332 in FIG. 11, for example.

It will be appreciated that any suitable combination of curing cycle times, combination of curing cycle temperatures, or combination of curing cycle times and temperatures can be used. For example, primary conductive heat source 316 could be operated for a first cycle time t1 with radiative heat source 430 operated for a second cycle time t2 that is less than first cycle time t1. Additionally, or in the alternative, radiative heat source 432 could be operated for a third cycle time t3 that is less than first cycle time t1. In some cases, third cycle time t3 could be approximately equal to or less than second cycle time t2. As another example, primary conductive heat source 316 could be operated at a first nominal temperature T1 with radiative heat source 430 operated at a second nominal temperature T2 that is less than first nominal temperature T1. Additionally, or in the alternative, radiative heat source 432 could be operated for a third nominal temperature T3 that is less than first nominal temperature T1. In some cases, third nominal temperature T3 could be approximately equal to or less than second nominal temperature T2. It will be appreciated that any combination of the foregoing cycle times and nominal temperatures could also be used.

It will be appreciated that the one or more modules of controller 324, which are shown and described herein as modules 330-338, 342 and 344, can be provided in any suitable manner, such as software, hardware and/or a combination of hardware and software, for example. In some cases, modules 330-338, 342 and 344 can take the form of algorithms, routines and/or programs. If provided in whole or in part as software, the configuration and operation modules of controller 324 can be provided and stored in any suitable manner or arrangement. For example, all of the algorithms, routines and/or programs could be integrated into a single software program in which separate sections or portions of the software code will perform the various actions and/or activities of the system. In another embodiment, two or more independent modules (e.g., algorithms, routines and/or programs) could be used to perform the various actions and/or activities of the system.

Furthermore, memory 328 can store or otherwise retain any suitable data, values, settings, software, algorithms, routines, programs and/or any other information, in any suitable manner or form. And, in a preferred arrangement, microprocessor 326 can be in communication with memory 328 and can be operative to selectively access and/or process one or more of data, values, information, algorithms, routines and/or programs, such as those retained in memory stores 330-338, 342 and 344, for example, alone or in combination. For example, microprocessor 326 can run or otherwise process an algorithm, routine or program, such as from one or more of memory locations modules 330, 334-338, 342 and 344 that is operative to access, analyze or otherwise utilize data and/or information, such as may be stored in memory location 332, for example.

Figure 12:
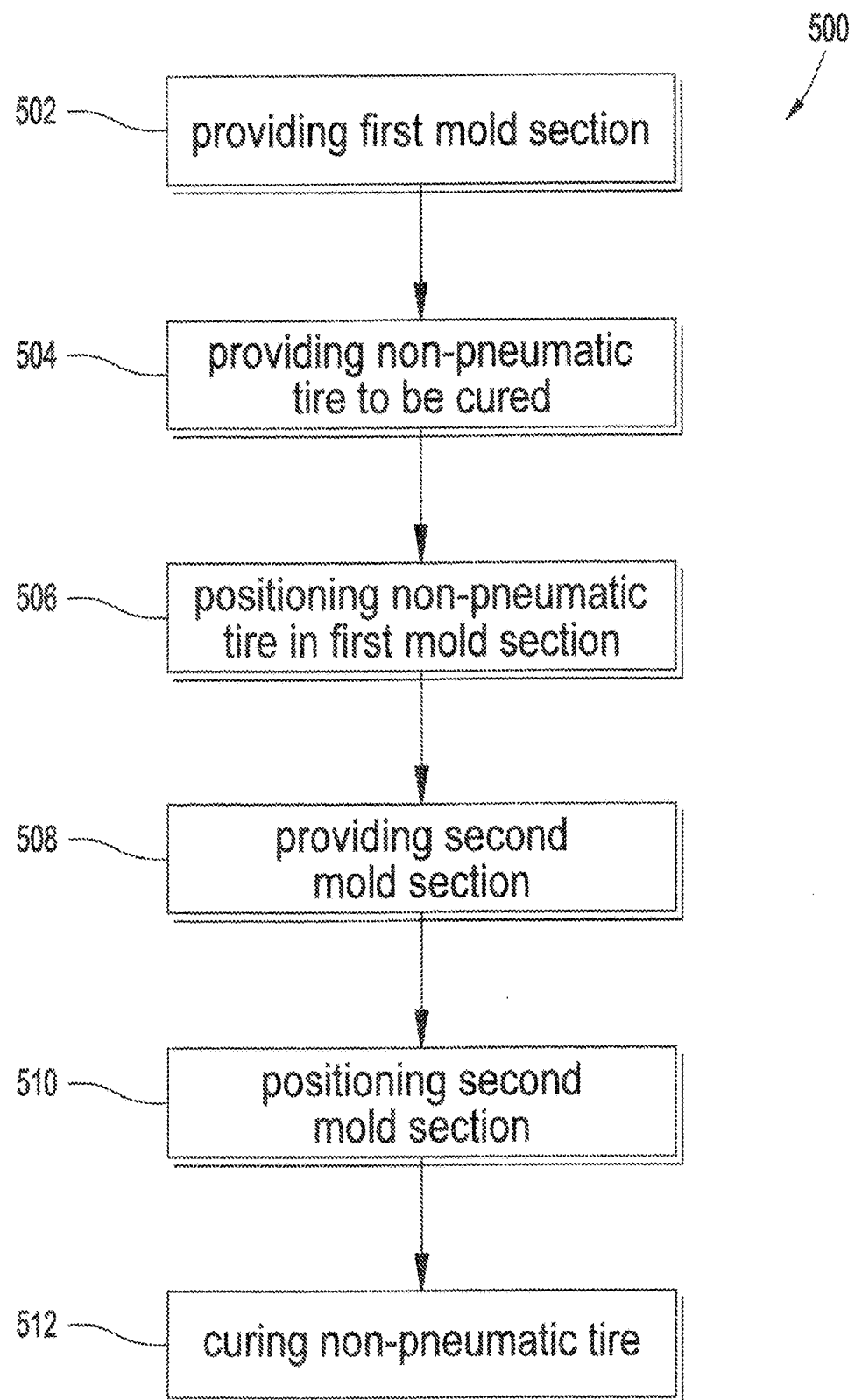
FIG. 12 is a graphical representation of one example of a method of manufacture in accordance with the subject matter of the present disclosure.

A method 500 of manufacturing in accordance with the subject matter of the present disclosure of manufacturing a non-pneumatic tire is shown in FIG. 12 can include providing a first mold section that includes a first radiative heat source, such as mold section 402, for example, as is represented in FIG. 12 by reference number 502. Method 500 also includes providing less-than-fully-cured non-pneumatic tire 100 and positioning the less-than-fully-cured non-pneumatic tire on or along the mold section such that a rim of the less-than-fully-cured non-pneumatic tire is axially coextensive with the first radiative heat source, as indicated by reference numbers 504 and 506, respectively. Method 500 further includes providing a second mold section that includes a second radiative heat source, such as mold section 404, for example, as is represented in FIG. 12 by reference number 508. Method 500 also includes positioning the second mold section across the first mold section such that the second radiative heat source is axially coextensive with the rim of the less-than-fully-cured non-pneumatic tire, as indicated in FIG. 12 by reference number 510. The method further concludes curing the less-than-fully-cured non-pneumatic tire through radiative transfer of heat from the first and second radiative heat sources, as indicated by reference number 512 in FIG. 12. In a preferred arrangement, curing the less-than-fully-cured non-pneumatic tire can include curing with a combination of conventional conductive heat transfer from a primary conductive heat source (e.g., primary conductive heat source 316) and radiative heat transfer from first and second radiative heat sources (e.g., radiative heat sources 430 and/or 432).

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus, it is to be distinctly understood claims directed to any such combination of features and/or components, whether or not specifically embodied herein, are intended to find support in the present disclosure. To aid the Patent Office and any readers of this application and any resulting patent in interpreting the claims appended hereto, Applicant does not intend any of the appended claims or any claim elements to invoke 35 U.S.C. 112(f) unless the words "means for" or "step for" are explicitly used in the particular claim.

While the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A method of manufacturing a non-pneumatic tire, said method comprising:
   providing a first mold section including an inner side surface portion at least partially defining a first mold cavity portion, a primary conductive heat source thermally coupled with said first mold section, and a first radiative heat source independently operable from said primary conductive heat source, said first radiative heat source disposed within said first mold cavity portion and spaced inwardly from said inner side surface portion such that an annular gap is disposed therebetween;
   providing a less-than-fully-cured non-pneumatic tire having an axis of rotation and including a rim and a quantity of less-than-fully-cured material disposed around said rim, said rim including an annular wall portion extending peripherally around said axis of rotation and a flange wall portion extending radially inward from along said annular wall portion with said quantity of less-than-fully-cured-material disposed radially outward of said annular wall portion, said flange wall portion oriented transverse to said axis of rotation and including a first flange side and a second flange side;
   positioning said less-than-fully-cured non-pneumatic tire along said first mold section such that at least a portion of said annular wall portion of said rim and at least a portion of said quantity of less-than-fully-cured material is disposed within said annular gap with said first flange side of said flange wall portion facing toward said first radiative heat source and said second flange side of said flange wall portion facing away from said first radiative heat source;
   providing a second mold section including a second radiative heat source independently operable from at least said primary conductive heat source;
   positioning said second mold section across said first mold cavity portion such that said second radiative heat source is disposed in facing relation to said second flange side of said flange wall portion; and,
   curing said non-pneumatic tire.

2. A method according to claim 1, wherein curing said non-pneumatic tire includes conducting heat into said non-pneumatic tire from said primary conductive heat source, radiating heat into said rim of said non-pneumatic tire from said first radiative heat source, and radiating heat into said rim of said non-pneumatic tire from said second radiative heat source.

3. A method according to claim 1, wherein curing said non-pneumatic tire includes operating said primary conductive heat source at a first nominal temperature for a first period of time.

4. A method according to claim 1, wherein curing said non-pneumatic tire includes operating said first radiative heat source at a second nominal temperature for a second period of time.

5. A method according to claim 1, wherein curing said non-pneumatic tire includes operating said second radiative heat source at a third nominal temperature for a third period of time.

6. A method according to claim 1, wherein providing said first mold section includes providing a first temperature sensor operatively disposed within said first mold cavity portion, and positioning said less-than-fully-cured non-pneumatic tire along said first mold section includes thermally coupling said rim with said first temperature sensor.

7. A method according to claim 1, wherein providing said second mold section includes providing a second temperature sensor operatively disposed therealong, and positioning said second mold section across said first mold cavity portion includes thermally coupling said second temperature sensor with said rim.

8. A method according to claim 1, wherein curing said non-pneumatic tire includes selectively operating said first radiative heat source such that at least a section of said rim is maintained within a predetermined temperature range.

9. A method according to claim 1, wherein curing said non-pneumatic tire includes selectively operating said second radiative heat source such that at least a section of said rim is maintained within a predetermined temperature range.

10. A method according to claim 1, wherein curing said non-pneumatic tire includes selectively operating said primary conductive heat source such that said quantity of less-than-fully-cured material is maintained within a first temperature range for at least a first period of time and selectively operating said first and second radiative heat sources such that said rim is maintained within a second temperature range for at least a second period of time.

11. A method according to claim 1, wherein curing said non-pneumatic tire includes applying pressure to at least a portion of said less-than-fully-cured non-pneumatic tire.

12. A mold assembly for curing associated non-pneumatic tires that include an associated quantity of less-than-fully-cured material disposed peripherally around an associated rim with the associated rim including an associated annular wall and an associated flange wall, said mold assembly comprising:
a first mold section including an inner side surface portion at least partially defining a first mold cavity portion with a longitudinal axis, said first mold section thermally coupled with a primary conductive heat source;
a second mold section displaceable relative to said first mold section between a first position in which said second mold section extends at least partially across said first mold cavity portion and a second position in which said first mold cavity portion is accessible for loading and unloading an associated non-pneumatic tire;
a first radiative heat source independently operable from said primary conductive heat source, said first radiative heat source disposed within said first mold cavity portion and spaced inwardly from said inner side surface portion such that an annular gap is disposed therebetween with said annular gap dimensioned to receive at least a portion of the associated annular wall of the associated rim and at least a portion of the associated quantity of less-than-fully-cured material; and,
a second radiative heat source independently operable from said primary conductive heat source, said second radiative heat source supported on said second mold section and displaceable therewith between said first and second positions of said second mold section with said second radiative heat source spaced axially from said first radiative heat source in said first position of said second mold section to receive the associated flange wall of the associated rim between said first and second radiative heat sources.

13. A mold assembly according to claim 12 further comprising a first temperature sensor positioned along said first mold section for thermal coupling with the associated annular wall of the associated rim.

14. A mold assembly according to claim 12 further comprising a second temperature sensor positioned along said second mold section for thermal coupling with the one of the associated annular wall and the associated flange wall of the associated rim.

15. A mold assembly according to claim 12, wherein said first radiative heat source includes a base wall with a first plurality of radiative elements supported on said base wall, said first plurality of radiative elements positioned around said base wall in spaced relation to one another and facing radially outward toward said inner side surface portion of said first mold section.

16. A mold assembly according to claim 12, wherein said second radiative heat source includes a base wall with a second plurality of radiative elements supported on said base wall, said second plurality of radiative elements positioned around said base wall in spaced relation to one another and facing radially outward toward said inner side surface portion of said first mold section.

17. A mold assembly according to claim 16, wherein said first mold cavity portion at least partially defines a mold axis, and second said plurality of radiative elements are oriented at an acute included angle relative to said mold axis such that said second plurality of radiative elements face radially outward toward the associated annular wall and axially toward the associated flange wall of the associated rim.

18. A mold assembly according to claim 12 further comprising an interstitial curing system disposed within said first mold cavity portion in thermal communication with said primary conductive heat source.

19. A tire curing system for curing non-pneumatic tires, said tire curing system comprising:
a mold assembly according to claim 12; and,
a processor communicatively coupled with a memory and with said primary conductive heat source, said first radiative heat source and said second radiative heat source, said memory including instructions to:
operate said primary conductive heat source at a first nominal temperature for a first period of time;
operate said first radiative heat source at a second nominal temperature for a second period of time that is less than said first period of time; and,
operate said second radiative heat source at a third nominal temperature for a third period of time that is less than said first period of time.

20. A tire curing system according to claim 19, wherein said mold assembly includes said first temperature sensor and said second temperature sensor, and said memory includes instructions to receive outputs from said first and second temperature sensors having a relation to a temperature of the associated rim and operate at least one of said first and second radiative heat sources based on said outputs.

\* \* \* \* \*